June 12, 1951 T. M. SHRADER 2,557,012

MAGNETIC PHONOGRAPH AND REELING SYSTEM THEREFOR

Filed Nov. 13, 1945 5 Sheets-Sheet 1

INVENTOR

Terry M. Shrader

BY [signature]

ATTORNEY

MAGNETIC PHONOGRAPH AND REELING SYSTEM THEREFOR

Filed Nov. 13, 1945 5 Sheets-Sheet 2

INVENTOR
Terry M. Shrader
BY
C. D. Tuska
ATTORNEY

MAGNETIC PHONOGRAPH AND REELING SYSTEM THEREFOR

INVENTOR
Terry M. Shrader
BY
C D Tuska
ATTORNEY

June 12, 1951 T. M. SHRADER 2,557,012

MAGNETIC PHONOGRAPH AND REELING SYSTEM THEREFOR

Filed Nov. 13, 1945 5 Sheets-Sheet 4

INVENTOR
Terry M. Shrader
BY C. D. Tuska
ATTORNEY

MAGNETIC PHONOGRAPH AND REELING SYSTEM THEREFOR

INVENTOR.
Terry M. Shrader
BY C. D. Tuska
ATTORNEY

Patented June 12, 1951 2,557,012

UNITED STATES PATENT OFFICE 2,557,012

MAGNETIC PHONOGRAPH AND REELING SYSTEM THEREFOR

Terry M. Shrader, Indianapolis, Ind., assignor to Radio Corporation of America, a corporation of Delaware Application November 13, 1945, Serial No. 628,295

8 Claims. (Cl. 179—100.2)

This invention relates to magnetic sound recording and reproducing apparatus and, though not limited thereto, has special reference to the provision of improvements in reeling systems for magnetic phonographs or "telegraphones" of the type wherein the wire or other flexible record is contained in a removable casing or "cartridge."

Considered from one aspect the present invention comprises an improvement upon the inventions disclosed in copending application Ser. Nos. 584,197, now Patent No. 2,507,385, granted May 9, 1950 and 596,690, now Patent No. 2,463,-001, to the same inventor.

While several factors determine the quality of a magnetic recording it may be said, generally, that it is impossible to achieve optimum performance, either during the recording or reproducing cycles, with a wire record if the wire is subject to shocks or tremors or to variations in its tension or in its reeling speed. Such undesired movements, if of sufficient intensity, may break the wire and, in any event, are manifest by the acoustic disturbances known in the art as "wows." The vibrations responsible for "wows" can often be traced to some unevenness in the winding of the wire upon its reels.

As brought out in application Ser. No. 584,197, the evenness with which a wire, of a given diameter, is wound upon a reel, of certain width, is a function of the distance between the reel and the point from which the wire is fed to the reel. Thus, if the distance between the said point and reel is long enough and the reel groove is narrow enough the wire will pile-up evenly in the reel groove without the aid of any reciprocating mechanism, while if the distance is short and the reel groove is wide the wire may "pyramid" in the groove. In this latter case the top layer or apex of the pyramid is eventually projected to the bottom of the groove. It is this sudden lateral displacement and the resulting unevenness in tension which may cause the wire to vibrate or to kink and thereby cause distortion during its recording or playing cycles. Such defects are especially pronounced when the magnetic unit or "sound-head" itself comprises the closest "point" to either the storage or take-up reels.

When (as in the said earlier filed case) a stationary wire guide is inserted between the reels and the sound-head it is usually necessary or expedient to increase the effective length of the path between the reels if sharp-turns and uneven winding are to be avoided. Such increased spacing is often undesirable, especially in telegraphones of the type wherein the wire and the reeling mechanism therefor are contained in a relatively small casing or "cartridge."

Accordingly, it is an object of the present invention to provide an extremely compact reeling system for magnetic wire recorders and one characterized by its constant speed and by its freedom from vibration and other acoustically noticeable defects.

Another and important object of the present invention is to provide a magnetic recording and reproducing apparatus which shall obviate the use of plug-type connectors and other potential sources of noise and which shall dispense with the clutching, keying, wire-threading and other alignment problems incident to the use of present-day telegraphones.

A related object of the invention is to provide an improved telegraphone of the type (exemplified by copending application Ser. No. 596,690 to the same inventor) wherein the sound-head, the wire record and the wire reeling mechanism are brought into playing position simply by dropping or otherwise inserting the record cartridge within a slot in the cabinet of the set.

Another object of the present invention is to provide an improved intermittently actuated plural-wire cartridge type telegraphone which shall be suitable for use in conjunction with a vending machine or the like, and one wherein the start-stop and the reversing mechanisms, as well as the wire records and the reeling system therefor, are mounted within the cartridge.

Still another object of the present invention is to provide a reeling system which shall retain all of the foregoing advantages when applied to an installation requiring the use of wide-grooved reciprocating reels.

The invention will be described in connection with the accompanying drawings, wherein:

Fig. 1 is a view in perspective of a single-wire reeling system constructed in accordance with the principle of the invention, the wire being marked to indicate its path between the storage and take-up reels, Fig. 2 is an enlarged sectional view taken on the line II—II of Fig. 1 showing springs within the reels for maintaining the wire records under uniform tension, Fig. 3 is a view in perspective of a plural wire reeling system within the invention, Fig. 4 is a view in perspective of a casing or cartridge within which the reel assembly of the invention is mounted.

The present invention contemplates, and its practice provides, a reel assembly for a telegraphone record comprising a plurality of reels, and a plurality of driving rollers mounted in spaced relation with respect to the reels and over which the record travels from one reel to another. The storage and take-up reels may rotate about a fixed axis (or axes) or they may be subject to a reciprocating action. In either event it is an important feature of the invention that the portion of the path of the record which lies between each reel and the driving roller which is next adjacent thereto, in point of record travel, is free and unencumbered throughout its length and preferably is of the maximum possible length for a given minimum reel-to-roller spacing.

Figures 1, 2:
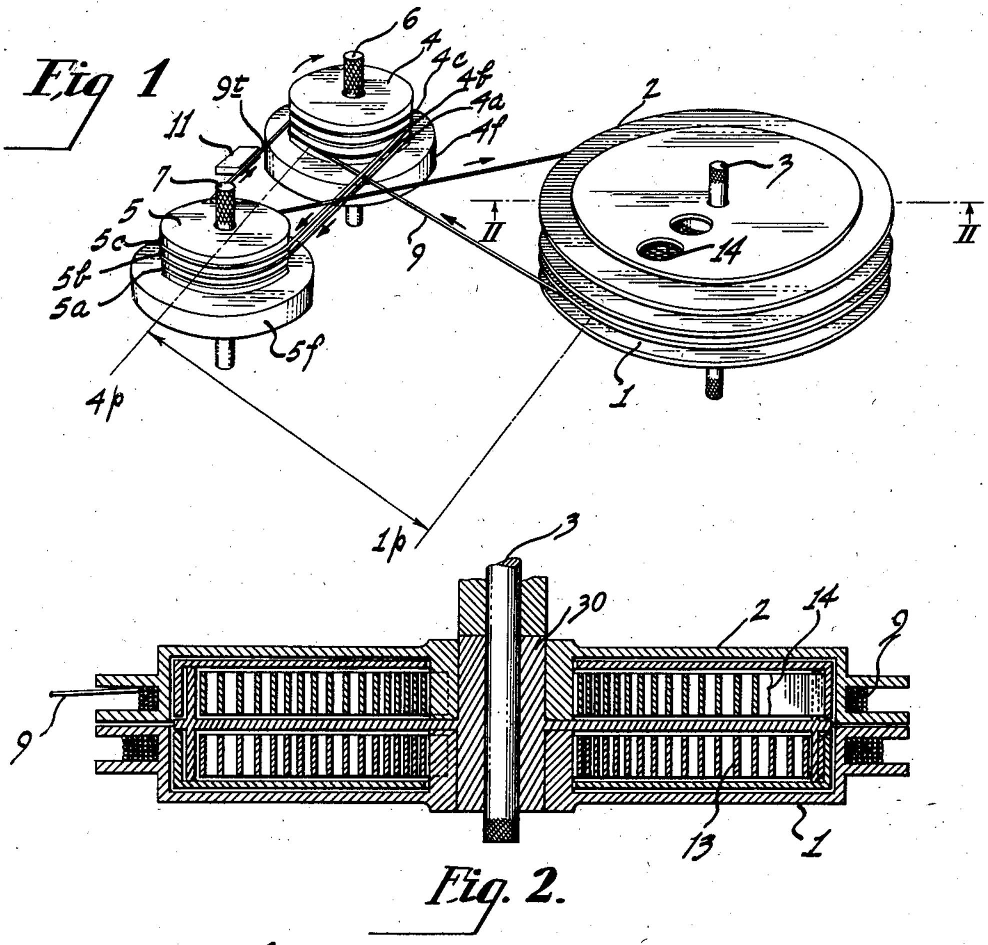

In the single-wire reeling system of Fig. 1, there is shown a storage reel 1 and a take-up reel 2 mounted for independent rotation, in either direction, about a common axis or shaft 3 and two driving rollers 4 and 5 mounted in spaced relation for rotation about separate axes or shafts 6 and 7, respectively, parallel to the reel shaft 3. A telegraphone record in the form of a wire 9 is wound to run between the storage reel 1 and the take-up reel 2 over the driving rollers 4 and 5 in paths tangent to the reels and rollers. The driving rollers 4 and 5 are preferably of duplicate construction and are each provided with a number of parallel grooves, *4a*, *4b*, *4c*, *5a*, etc. within certain ones of which the wire is received, and with a circular flange *4f*, *5f*, respectively, to which a driving force is applied, in a manner later described, by means of a rubber tired wheel 10 (Fig. 9), in the cabinet of the set. The arrangement of the rollers and the spacing of the grooves thereon is preferably such that one groove on each roller is in register with the particular reel groove to which, or from which, the wire 9 is led. Thus, in the instant case groove *4a* on roller 4 is in register with, or in substantially the same plane as, the mid-plane of the "storage" reel 1, and groove *5c* on roller 5 is in register with the mid-plane of the groove in the "take-up" reel 2.

Figure 4:
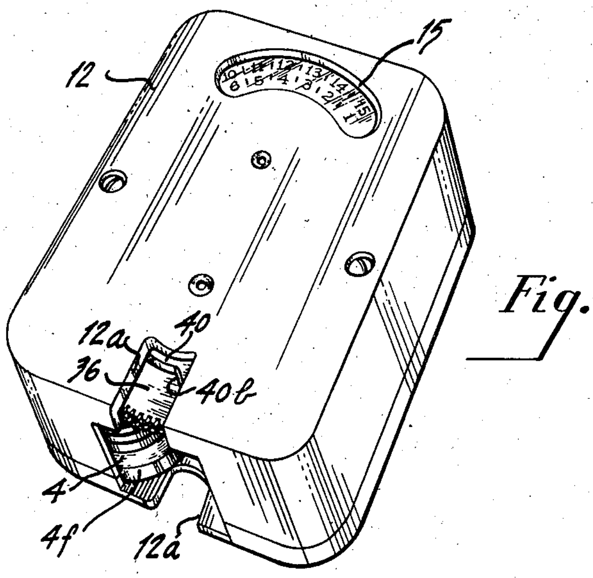

The spacing between the rollers per se should be long enough to accommodate a "sound head" 11 and the spacing between the rollers and the reels will ordinarily be determined by the space available in the casing or cartridge 12 (Fig. 4) in which the reel assembly is contained.

Figures 8, 9:
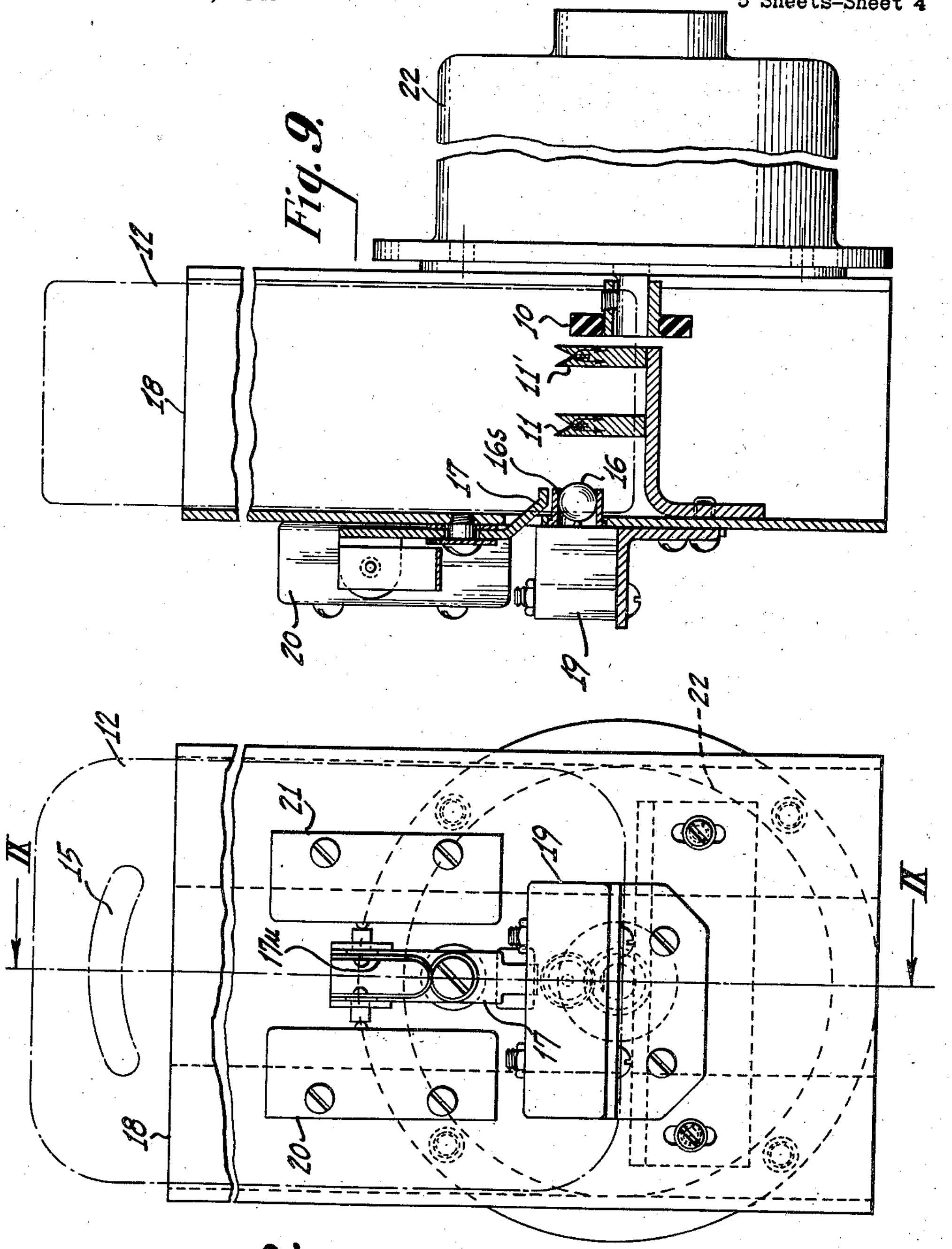
Fig. 8 is a front plan view of a telegraphone cabinet including a socket for the reception of the record cartridge of Fig. 3.
Fig. 9 is a sectional view taken on line IX—IX or Fig. 8.

The present invention is not especially concerned with the design of the "sound-head" 11. Suffice it to say that it may contain an "erasing" coil (for erasing a previous recording) an "applicator coil" (for applying a magnetic recording to the wire) and a "pick-up coil" (for picking-up the magnetic recording). These coils and their cores may be very small (say, 0.075" diameter) and, as indicated in Figs. 1 and 9 may be embodied in a grooved block of non-magnetic material. It is of course entirely possible to perform the functions of two or indeed three such coils, selectively, with a single coil. One satisfactory form of coil is shown in copending appln. Ser. No. 591,071, now Patent No. 2,469,444, of Henry E. Roys.

As previously set forth, the present invention teaches that the path of the wire-record should be such that the part of the path which lies between a given reel and the roller which is next adjacent thereto (in point of record-travel) is free and unencumbered throughout its length and of the maximum possible length for a given minimum reel-to-roller spacing. Thus, referring still to Fig. 1, it will be observed that the wire 9 in leaving the storage reel 1 travels to a point *4p* on the circumference of the roller 4 which gives the greatest free length of wire. Here, clearly, the points *4p* and *1p* are as far apart as possible for a given reel-to-roller spacing. Furthermore, it will be observed that the course of the wire between the points *1p* and *4p* (as well as its course between the corresponding points on the roller 5 and the reel 2) is free and unencumbered throughout its length so that, when the parameters of the wire, the reels and the rollers are properly chosen, there is nothing to prevent the wire from piling up evenly in (or being withdrawn from) the reel grooves.

As above indicated, and as disclosed in copending appln. Ser. No. 584,197, if the wire is to pile-up evenly in the reel grooves, without the aid of any reciprocating wire guide the width of the said grooves must be small as compared to the length of its "free path" (*1p*, *4p*, Fig. 1). In applying the invention to the construction of a reel assembly for 0.004" wire the reel grooves should be substantially no wider than 0.0112", in which case the minimum length of the "free path" between the reels and rollers is 1.25" When 0.006" wire is employed the reel grooves may be as wide as 0.125" in which case the "free path" should be no shorter than 1.5". The parameters for a reel assembly designed to handle five-mil wire are intermediate the above mentioned figures.

Another important feature of the invention resides to the provision of a method of so winding the wire 9 over the two rollers 4 and 5 that but a single section or "straight turn" *9t* of the wire is presented to the sound head 11. This "straight turn" *9t* extends from the groove *5b* in roller 5 to the groove *4b* in roller 4. Since these grooves *5b* and *4b* are directly opposite to one another, the wire cannot rub against the side walls of the groove and set up undesired vibrations in the wire adjacent to the sound head 11. The path of the wire from the storage-reel 1 to the take-up reel 2 is as follows: From reel 1 to and half way around the bottom groove *4a* on roller 4; from groove *4a* the wire crosses over to and is wrapped half way around the middle groove *5b* on the other roller 5; then across to and half way around the opposite (middle) groove *4b* on the first roller 4; then across to and half way around to top groove *5c* on roller 5, from whence it travels in a straight line to the take-up reel 2.

Any vibratory or other undesired movement of the wire adjacent to the reels is prevented from being transmitted to the straight turn *9t* by the "snubbing" action of the rollers 4 and 5 around which the wire must travel before it reaches the said straight turn. Similarly, any irregularity in tension on the wire is corrected by the "fly-wheel" action of these motor driven rollers 4 and 5. In order to avoid sharp-bends, which tend to demagnetize the wire, the driving rollers should have a diameter, adjacent to their grooves of at least 0.75". The use of two driving rollers, with the wire wrapped around both rollers, as shown, substantially reduces the effects of jerks resulting from any unevenness in the winding of the wire on its reels. The mass and hence the inertia of the reels is low, as compared to that of the motor and the rollers 4 and 5 and further reduces the magnitude or power of such jerks.

It will be noted from the foregoing description of the path of the wire that only two (of the three) grooves are used on each roller. Thus, the top groove 4c on roller 4 and the bottom groove 5a on roller 5 are not utilized and hence could be omitted, if desired. However, it is preferable to make these rollers of duplicate construction so that it becomes immaterial which roller is placed upon a given shaft.

As previously set forth, it is important that the portion (*1p*—*4p*) of the path of the record which lies between the reels and driving rollers be free and unencumbered. Thus, the advantages of the invention would be impaired by the presence in the said path of a conventional wire tensioning mechanism (such for example, as a spring actuated arm, or the like). Accordingly, the force required to maintain uniform tension on the wire is exerted at the reel-end of the wire, preferably by means of clock springs 13 and 14 (see Fig. 2) mounted within the reels 1 and 2, in the manner disclosed in applicant's copending application Ser. No. 584,197. These springs 13 and 14 are wound in opposite directions and maintain tension on the wire 9 irrespective of the direction of the driving force applied to the driving rollers 4 and 5 by the wheel 10. The springs thus prevent the development of slack in the wire due to differences in the effective diameter of the reels in winding from a full reel to an empty reel. That this is so will be more readily apparent when it is observed that when the rollers 4 and 5, and the reels 1 and 2 are driven clockwise (so that the roller 4 pulls the wire 9 off the reel 1) the biasing force of the spring 13 is exerted in the opposite (counterclockwise) direction upon the reel 1 and thus maintains the wire under tension. When the wire is piled higher on reel 1 than on reel 2, reel 1 runs relatively slower than reel 2 and some of the energy stored in spring 13 is released. When the wire is piled to the same height on both reels, they run at the same speed. When the wire is piled higher on reel 2 than on reel 1, reel 1 runs relatively faster than reel 2 and energy is returned to both of the springs 13 and 14. When the direction of rotation of the rollers and reels is reversed the above described movements and bias are relatively reversed. Irrespective of the direction of rotation of the reels both springs are in their wound condition at the end of each operating cycle.

Figure 3:
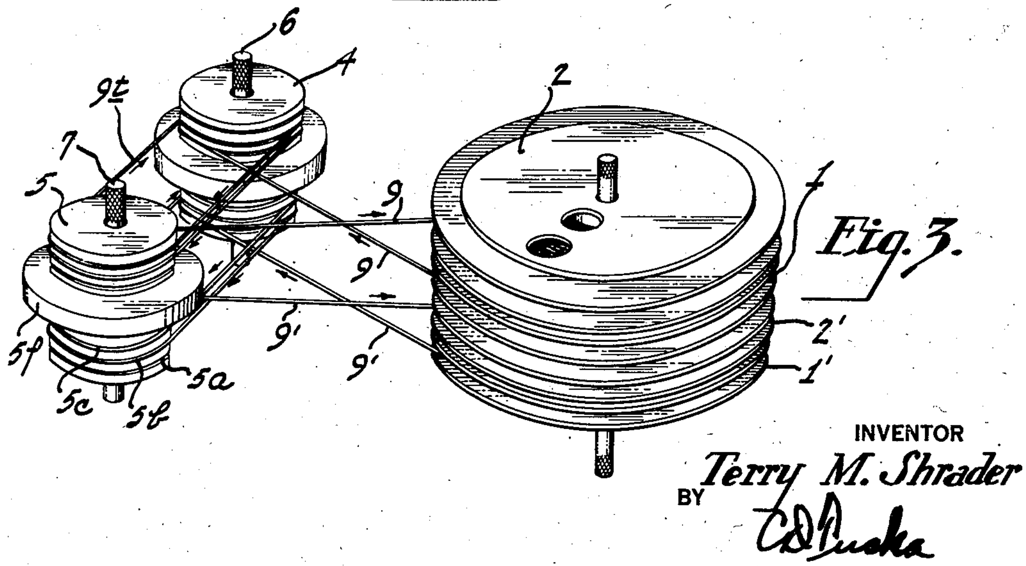

The reeling system of the invention lends itself readily for use in a plural-wire telegraphone or phonograph. In this case, referring now particularly to Fig. 3, it is merely necessary to provide the driving rollers 4 and 5 with a duplicate set of grooves for the extra wire 9' and to provide a second set of reels 1' and 2' for the said wire. The path of this extra wire 9' about the rollers is the same as described in connection with the single wire system of Fig. 1 wherein it was pointed out that the arrangement of the rollers and the spacing of the parallel grooves thereon is such that the grooves on each roller are in register, respectively, with the particular reel-groove to which, or from which, the wire is led. (As to this, see also Fig. 6, wherein it will be observed that groove 4a in the roller 4 is in register with the "storage" reel 1, and groove 5c on the roller 5 is in register with the "take-up" reel 2.) The circular flanges 4f, 5f, through which the driving force is applied to the rollers 4 and 5 may be arranged either between the wires, as shown in Fig. 3, or at one end of the roller shafts, as shown in Fig. 5.

Figure 10:
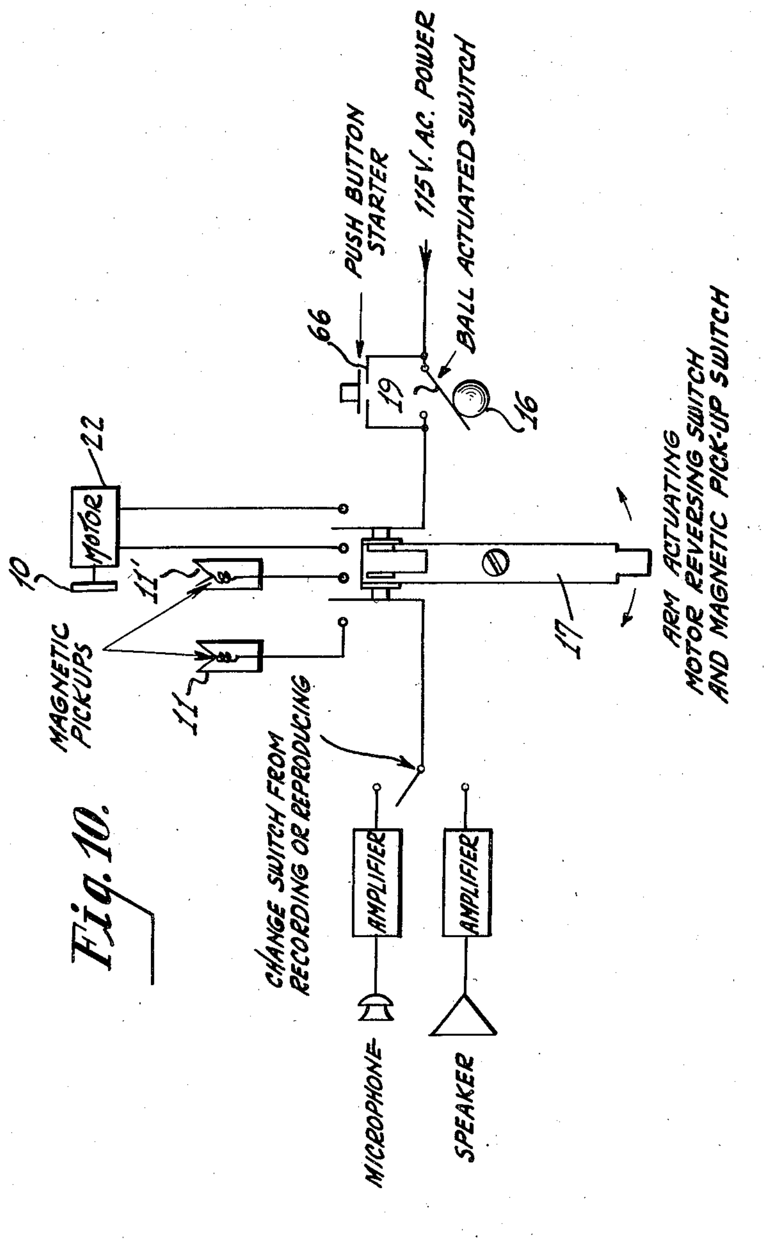
Fig. 10 is a diagram including an electrical circuit for controlling the operation of the apparatus of Figs. 8 and 9.

If desired, the reeling system of the invention may comprise a permanent installation in the cabinet of the set. However its simplicity and compactness recommends its use in a removable cartridge or casing 12 such as the one shown in perspective in Fig. 4 and in outline in Figs. 8 and 9. As will hereinafter more fully appear, this cartridge 12 contains in addition to the plural-wire reeling system described in connection with Fig. 3, an elapsed time or footage indicator having indicia which are visible through a window 15 (Figs. 4 and 8) in the cover of the casing, and a "start-stop mechanism" including an apertured gear 36 and a face cam 40 (Figs. 5 and 6) which operate through a ball 16 and lever arm 17 (Figs. 8, 9 and 10) in the socket 18 (Fig. 2) of the set to actuate a bank of three switches 19, 20 and 21 which control the operation of the reversible driving motor 22 and also serve to reverse the electrical connections to the two magnetic pickup units 11 and 11' (Figs. 9 and 10). In this connection it should be noted that the cover, base and "bottom" of the cartridge 12 are cut away as indicated at 12a (Fig. 4) to receive the driving wheel 10 (Fig. 9), the two "soundheads" 11 and 11' and the ball 16 and lever 17 of the switch mechanism. Thus, when the cartridge 12 is inserted in its socket 18 (Figs. 9 and 10) in the cabinet of the set the motor driven wheel 10 engages the flanges of the driving rollers 4 and 5 and the "straight turns" *t* and *t'* of the two wire records 9 and 9' are laid in the grooved soundheads 11 and 11', respectively, while at the same time the apertured gear 36 and the face cam 40 are brought into operative relation, respectively, with the ball 16 and the lever arm 17 of the switch mechanism.

Figure 5:
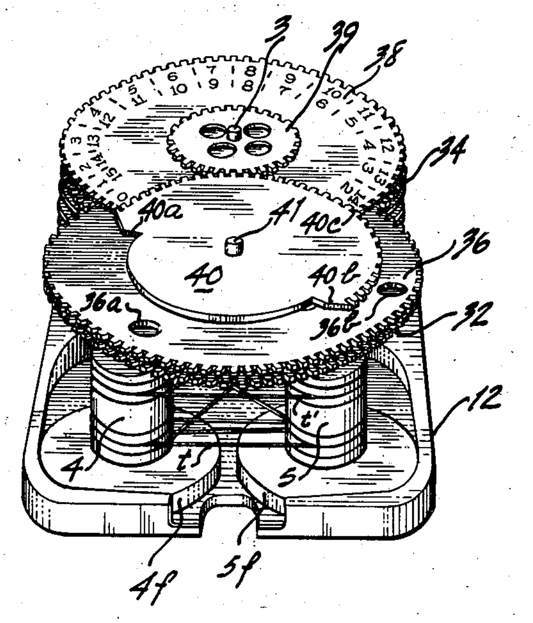
Fig. 5 is a view in perspective of the cartridge of Fig. 4, with the cover removed, and showing an assembly of gears for stopping, reversing and indicating purposes.
Figure 6:
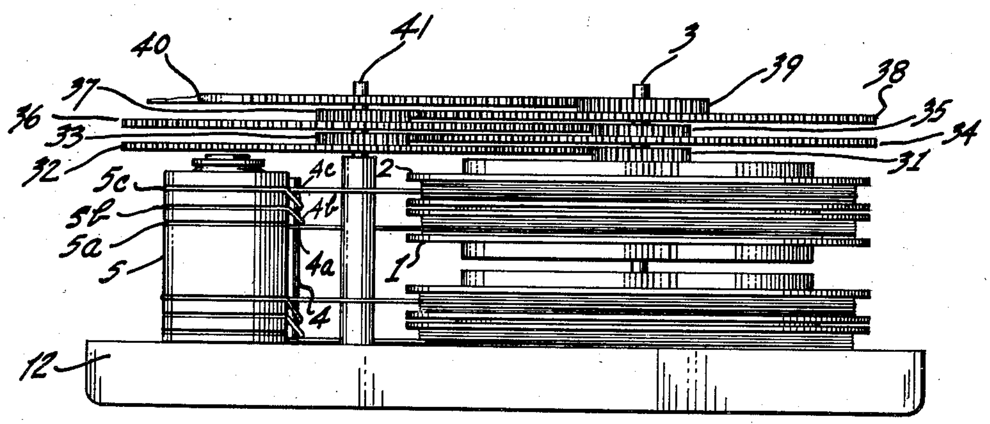
Fig. 6 is a side elevational view of the device shown in perspective in Fig. 5.

The gear train of the indicating and reversing mechanism shown in Figs. 5 and 6 comprises ten gears, counting the face cam 40. The gears numbered 31, 34, 35, 38 and 39, revolve about the reel shaft 3 and the gears numbered 32, 33, 36, 37, and 40, which mesh therewith, revolve on an auxiliary spindle 41 which is secured to the base of the cartridge. The gear train is driven by the small (say, 0.5" diameter) gear 31 which is fastened to the sleeve 30 (Fig. 2) upon which the reels rotate. The other small gears 35 and 39 on the shaft 3 are welded to the larger gears 34 and 38, respectively, and the small gears 33 and 37 on shaft 41 are welded to the larger gears 32 and 36 respectively.

The large (3¼" diameter) gear 36 operates the on-off switch 19 (Figs. 9 and 10) through the ball 16 which is pushed into and forced out of a series of holes 36a, 36b, *etc.* (Fig. 5) in the gear surface. In one embodiment of the invention wherein the cartridge contained two wire-records each having a playing time of fifteen minutes and contained forty-five discrete messages or recordings on each record, the gear 36 contained three holes and made fifteen complete revolutions in fifteen minutes. Thus, the records 9 and 9' ceased playing at the end of each message. Obviously, when the cartridge is designed for use in a vending machine or for other purposes wherein the wire records contain a larger or smaller number of separate recordings, the gear 36 may be provided with a corresponding number of holes or the gear ratio may be changed to provide the requisite number of playing intervals.

The next large gear 38 in the train comprises the dial of the device and is calibrated in minutes of recording (or playing) time available on each of the two records 9 and 9'. The final large (2½'' diameter) notched gear or "face cam" 40 operates the pivoted arm 17 (Figs. 8 and 9) that actuates the reversing switches 20 and 21 which select the proper sound-head and control the direction of rotation of the motor driven wheel 10. Thus, it will be observed upon inspection of Fig. 5 that the teeth on the final gear 40 extend through an arc of about 180° and that the remaining portion of its periphery is cut away to form two cam surfaces 40*a* and 40*b* which lie on opposite sides of the said lever arm 17 when the cartridge is in its socket, hence one or the other of said cam surfaces will engage and tilt the said arm at the end of the (180°) movement of the cam in either direction. The radius of each of the cam surfaces 40*a* and 40*b* is sufficiently long to cause the said surfaces to intercept the sleeve 16*s* (Fig. 9) in which the ball 16 for the start-stop mechanism is mounted. Thus, in the event that the electrical switches 20 or 21 fail to stop or reverse the motor 22, one of the projecting edges 40*a* or 40*b* of the cam will ride upon the sleeve 16*s* within which the ball 16 is held, and raise the entire cartridge 12 off the driving wheel 10 thereby halting the movement of the wires 9 and 9' by depriving the rollers 4 and 5 of their driving force. In case of such failure the gear or cam 40 rotates through a larger than normal arc and this fact dictates the use of a U-shaped spring 17*u* (Fig. 8) on the switch lever 17 adjacent to the switch contacts so that excess pressure on the switches 20 and 21 is avoided.

Figure 7:
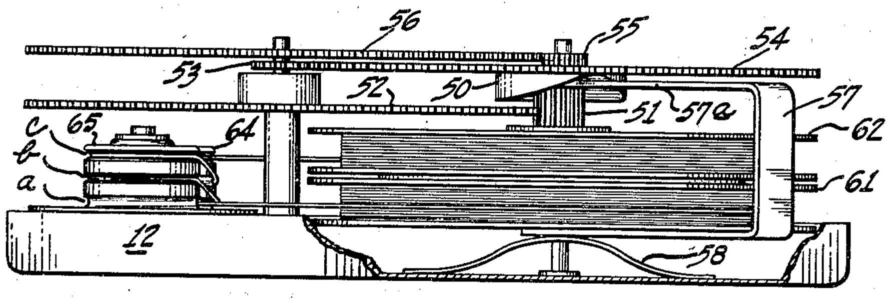
Fig. 7 is a partly broken away side elevation of an alternative embodiment of the invention showing a single wire system including a reciprocating wire guide suitable for use with relatively wide reels.

Before proceeding with the description of Figs. 8, 9 and 10 reference should be made to the alternative form of reel assembly shown in Fig. 7. This embodiment of the invention is designed for use with reels having wide grooves capable of accommodating an unusually long wire. In this case, rather than increase the diameter of the reels (and hence the size of cartridge) to the degree required to ensure even winding, a reciprocating reel mechanism is employed for that purpose. This mechanism comprises a suitably beveled cam 50 which is attached to and revolves with a gear 54 (which is driven at a reduced speed through gears 51, 52 and 53) and a cam follower in the form of a stiff U-shape arm 57 which is biased, as by means of a bowed spring 58 in the base of the cartridge, against the said cam 50. The outer end, 57*a*, of the cam follower 56 is acted upon by the cam 50 and bears against a small, wide gear 51 which is fixed to the outer surface of the upper reel 62; hence, when the beveled surface or "rise" of the cam 50 presses against the arm 57*a* the said arm urges the gear 51 and hence the reels 62 and 61 "downwardly" (against the force of the biasing spring 58), i. e. in a direction normal to the plane of the grooves (*a, b, c*) in the roller 64 and 65 from which, or to which, the wire passes.

This movement as well as the movement of the reels in the opposite ("upward") direction is controlled by the rise of the cam 50. In the drawing the reels 61 and 62 are shown in the position whereat they have reached the upper limit of their lateral movement and are being urged downwardly by the force exerted by the cam 50 upon the arm 57*a* and gear 51. It will be observed that the small, wide gear 51 is the only gear in the train; (51, 52, 53, 54, 55, 56) which is subject to any axial movement. The final large year 56 in this case comprises the indicating gear upon which the dial scale is marked.

Referring now particularly to Figs. 8, 9 and 10. The general operation is as follows: Inserting the cartridge 12 into the socket 18 lays the "straight turns" of the steel wires 9, 9' in the grooves of the magnetic soundheads 11 and 11', respectively, and brings the flanges of the driving rollers 4 and 5 into contact with the rubber-tired driving wheel 10. When the cartridge is within its socket the face cam 40 (Fig. 4) is in position to engage the switch arm 17, and the ball 16 of the start-stop switch 19 is in the path of the holes 36*a*, 36*b* of the gear 36. As shown in Fig. 8, the top cartridge 12 extends beyond the cabinet so that the indicator 15 can be seen by the operator.

Starting the motor 22 causes the driving wheel 10 and rollers 4 and 5 to rotate and drive the two steel wires across the soundheads. The wires drive the reels, springs and gear train. Rotation continues until the ball actuated switch 19 opens the motor circuit. Shunting this switch momentarily by a push-button switch 66 (Fig. 10) starts the motor 22, pushes the ball 16 out of the hole 36*a* or 36*b* in the gear 36, closes the switch 19 and operation continues until the next hole in the gear 36 allows the ball 16 to open the switch again. This is repeated until the face cam 40 in the gear train moves the arm 17 which actuates the stopping or reversing switches 20 and 21. If the connections are such as to reverse the motor, operation continues in the reverse direction the same as before until the motor is again reversed and the cycle is repeated. One of the switches 20 or 21 actuated by the arm 17 switches the electrical connection to the amplifier equipment from one magnetic soundhead 11, 11' to the other as determined by which wire is reproducing or recording.

It will now be apparent that the "telegraphone" above described is very simple to operate. The record cartridge is simply inserted in its socket; there is no locking necessary, no drive shafts to be lined up, no threading of wire, no shifting of friction tension devices and no electrical connections to make. There are no electrical plugs and jacks to give trouble at low signal levels. The drive is very simple and gives constant wire speed. There are no belts and no auxiliary drums or pulleys. Only one motor is required, whereas other systems either sacrifice constant wire-speed or use an extra motor, belts, friction drives or other auxiliary mechanism which adds to the cost of the assembly and complicates its operation.

What is claimed is:

1. A reel assembly for a telegraphone-record comprising a plurality of reels mounted for rotation about a common axis and each having a groove therein for receiving a wire record, and a pair of driving rollers mounted in spaced relation for rotation about separate axes parallel to said first mentioned axis and around which said wire is driven in its journey from one reel groove to another, the diameter of said wire being approximately 0.004 of an inch, the width of said reel groove is substantially no greater than 0.112 of an inch and the distance between each of said reel grooves and the driving roller which is next adjacent thereto, in point of travel, is not less than 1.25 inches whereby upon reeling said wire onto said reel from said adjacent roller, said wire will pile-up substantially evenly in said reel groove.

2. A reel assembly for a telegraphone-record comprising a plurality of reels mounted for rotation about a common axis and each having a groove therein for receiving a wire record, and a pair of driving rollers mounted in spaced relation for rotation about separate axes parallel to said first mentioned axis and around which said wire is driven in its journey from one reel groove to another, the diameter of said wire being approximately 0.006 of an inch, the width of said reel grooves is substantially no greater than 0.125 of an inch and the distance between each of said reel grooves and the driving roller which is next adjacent thereto, in point of travel, is not less than 1.50 inches whereby upon reeling said wire onto said reel from said adjacent roller, said wire will pile-up substantially evenly in said reel groove.

3. A reel assembly for a flexible telegraphone-record comprising two grooved reels mounted for rotation about a common axis, two driving rollers mounted in spaced relation for rotation about separate axes parallel to said common axis and around which said flexible record is adapted to be driven from one reel to the other, each of said driving rollers being provided with a first record-receiving groove which lies in substantially the same mid-plane as the reel groove which is next adjacent thereto in point of record-travel and a second parallel groove which lies substantially in the same mid-plane as one of the grooves in the other roller, said record being so wound between said reel grooves and said roller grooves that but a single turn of said record extends between the sides of the rollers which lie remote from said reels.

4. The invention as set forth in claim 3 and wherein said reel assembly is contained in a casing having an aperture therein across which said single-turn of said record extends and through which access may be had to said driving rollers.

5. In apparatus of the character described, the combination with a cartridge containing a reelable magnetic record upon which a plurality of discrete recordings are impressed, a reel assembly comprising a storage reel, a take-up reel and a pair of driving rollers around and between which said record is adapted to travel in its journey between said storage and take-up reels, and a switch control member in the form of a disc having discrete cam surfaces thereon for stopping said record at the end of each of said recordings, said cartridge containing an aperture through which said record, said driving rollers and said switch control member are accessible, of a cabinet including a socket within which said cartridge is adapted to be received, said socket containing a driving member for said driving rollers, a sound head for said magnetic record, and switch means for said switch control member, said driving member, said sound head and said switch means being mounted within said socket in a position to be coupled, respectively, to said driving rollers, said magnetic record and said switch control member when said cartridge is received in said socket.

6. In apparatus of the character described, the combination with a cartridge containing a reelable magnetic record, reelable means upon which said record is wound and means for controlling the direction of rotation of said reelable means, said cartridge containing an aperture through which said record, said reelable means and said control means are accessible, of a cabinet including a socket within which said cartridge is adapted to be received, said socket containing a driving member for said reelable means, a sound-head for said magnetic record and a control member for said controlling means, said driving member, said sound-head and said control member being mounted within said socket in a position to be coupled, respectively, to said reelable means, said magnetic record and said direction controllling means, when said cartridge is received in said socket.

7. In apparatus of the character described, the combination with a cartridge containing a reelable magnetic record, a reel assembly comprising a storage reel, a take-up reel and a pair of driving rollers around and between which said record travels in its journey between said storage and take-up reels, and a rotatable cam mounted in driven relation with respect to said reels for halting the movement of said record at the completion of said journey, said cartridge containing an aperture through which said record, said driving rollers and said rotatable cam are accessible, of a cabinet including a socket within which said cartridge is adapted to be received, said socket containing a driving member mounted in a position to engage said drive rollers, a sound-head mounted in a position to engage said magnetic record, switch means mounted in the path of movement of said rotatable cam for controlling the operation of said driving member, and an auxiliary control member comprising a stationary protuberance mounted adjacent to said switch means in the path of movement of said cam to impart, through said cam, a disengaging camming movement to said driving member thereby to ensure timely cessation of the movement of said driving rollers, said reels and said record in the event that said switch means fails to operate.

8. A reciprocating reel assembly for a telegraphone record comprising a stationary shaft, two reels mounted side by side for independent rotation and for simultaneous axial movement on said shaft, a plurality of driving rollers mounted in spaced relation with respect to said reels and over which said record is adapted to be driven from one reel to the other, means for imparting rotary movement to said driving rollers and hence to said reels, a cam mounted for independent rotation on said shaft, a cam follower mounted on said shaft only for axial movement with said reels, means for biasing said reels and said cam follower in the axial direction required to maintain said cam follower in contact with said cam, and a reduction gear mechanism operatively connected between one of said reels and said cam for imparting axial movement to said reels through said cam follower.

TERRY M. SHRADER.

(References on following page)

REFERENCES CITED

The following references are of record in the file of this patent:

UNITED STATES PATENTS

| Number | Name | Date |
|---|---|---|
| 1,237,496 | Frankhauser et al. | Aug. 21, 1917 |
| 1,718,355 | Hutchison | June 25, 1929 |
| 2,096,445 | Begun | Oct. 19, 1937 |
| 2,160,495 | Francis | May 30, 1939 |
| 2,275,961 | Heller | Mar. 10, 1942 |
| 2,306,660 | Gift, Jr. | Dec. 29, 1942 |
| 2,372,810 | Camras | Apr. 3, 1945 |
| 2,428,002 | Barrett | Sept. 30, 1947 |
| 2,455,187 | Owens | Nov. 30, 1948 |
| 2,457,699 | Marsen | Dec. 28, 1948 |

FOREIGN PATENTS

| Number | Country | Date |
|---|---|---|
| 633,160 | Germany | Nov. 26, 1931 |